US007014354B2

(12) United States Patent
Donthnier et al.

(10) Patent No.: US 7,014,354 B2
(45) Date of Patent: *Mar. 21, 2006

(54) POWER BOWL LIFT, MOTOR MOUNT AND TENSIONER FOR MIXING MACHINE

(75) Inventors: Thomas S. Donthnier, Vandalia, OH (US); Richard Dwight Valentine, Hillsboro, OH (US); Janice J. Schnipke, Springfield, OH (US); Brian A. Brunswick, Troy, OH (US); Brian E. Bader, Springfield, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/051,824

(22) Filed: Feb. 4, 2005

(65) Prior Publication Data

US 2005/0141340 A1 Jun. 30, 2005

Related U.S. Application Data

(62) Division of application No. 10/329,257, filed on Dec. 23, 2002, now Pat. No. 6,883,959.

(51) Int. Cl.
*A21C 1/14* (2006.01)
(52) U.S. Cl. ........................... 366/203; 366/207
(58) Field of Classification Search ............... 366/92, 366/96–98, 197, 203, 206, 207, 288
See application file for complete search history.

(56) References Cited

U.S. PATENT DOCUMENTS

| 229,908 | A |   | 7/1880  | Nunan                     |
|---------|---|---|---------|---------------------------|
| 969,324 | A | * | 9/1910  | Bachman ............ 366/207 |
| 1,050,726 | A | * | 1/1913  | Fales ................ 366/92 |
| 1,071,334 | A |   | 8/1913  | Pease                     |
| 1,130,664 | A |   | 3/1915  | Bryan                     |
| 1,151,295 | A | * | 8/1915  | Schlueter .......... 126/345 |
| 1,158,198 | A | * | 10/1915 | Franke ............. 241/101.1 |
| 1,203,734 | A | * | 11/1916 | Heidland .............. 366/92 |
| 1,264,128 | A | * | 4/1918  | Rataiczak et al. ...... 366/207 |
| 1,463,736 | A | * | 7/1923  | Ward ................. 366/343 |
| 1,468,615 | A | * | 9/1923  | Guttenstein et al. ... 126/345 |
| 1,525,965 | A |   | 2/1925  | Thomas                    |
| 1,543,306 | A |   | 6/1925  | Van Berkel                |
| 1,548,919 | A | * | 8/1925  | Ward ................. 366/98  |
| 1,685,272 | A |   | 9/1928  | Campbell                  |
| 1,695,188 | A |   | 12/1928 | Henkel                    |
| 1,695,345 | A | * | 12/1928 | Read ................. 366/207 |
| 1,733,945 | A | * | 10/1929 | Dehuff ............... 366/207 |
| 1,747,443 | A | * | 2/1930  | Johnston ............. 366/207 |
| 1,761,237 | A | * | 6/1930  | Schiff ............... 366/185 |

(Continued)

FOREIGN PATENT DOCUMENTS

DE        3310451 C1 * 2/1984

(Continued)

OTHER PUBLICATIONS

Service manual entitled "Models H-600 and H-600-T and L-800 Mixers," by Hobart Corporation (Sep. 1977).

(Continued)

*Primary Examiner*—Charles E. Cooley
(74) *Attorney, Agent, or Firm*—Thompson Hine LLP (57) ABSTRACT

A mixing machine includes a power bowl lift mechanism that operates independent of a drive motor for mixing operations, and may be formed by a linear actuator. A pivoting motor mount assembly can be used in conjunction with a portable tensioning tool for tensioning a drive belt.

15 Claims, 9 Drawing Sheets

U.S. PATENT DOCUMENTS

| | | | |
|---|---|---|---|
| 1,767,155 A | | 6/1930 | Schuette |
| 1,781,321 A | * | 11/1930 | Dehuff .................... 474/31 |
| 1,809,430 A | | 6/1931 | Van Duyn |
| 1,832,302 A | | 11/1931 | Hobart et al. |
| 1,846,855 A | | 2/1932 | Folk |
| 1,878,033 A | | 9/1932 | Van Hoorn |
| 2,108,306 A | | 2/1938 | Cooper |
| 2,181,079 A | * | 11/1939 | Dehuff .................... 366/207 |
| 2,191,739 A | | 2/1940 | Bean |
| 2,251,903 A | * | 8/1941 | Anstice et al. ............ 366/185 |
| 2,404,380 A | * | 7/1946 | Jensen ..................... 475/11 |
| 2,563,120 A | | 8/1951 | Klingens et al. |
| 2,704,096 A | | 3/1955 | Olsen |
| 2,704,463 A | | 3/1955 | Hess |
| 3,075,746 A | * | 1/1963 | Yablonski et al. .......... 366/288 |
| 3,151,847 A | * | 10/1964 | Broomall .................. 416/111 |
| 3,262,680 A | * | 7/1966 | Balazer .................... 366/207 |
| 3,421,741 A | * | 1/1969 | Baechler ................... 366/98 |
| 3,848,437 A | | 11/1974 | Rottering |
| 4,050,339 A | | 9/1977 | Soleri |
| 4,165,466 A | | 8/1979 | Stikkers |
| 4,260,125 A | | 4/1981 | Levine |
| 4,298,342 A | | 11/1981 | Clayton et al. |
| 4,311,397 A | | 1/1982 | Wright |
| 4,416,648 A | | 11/1983 | Radocaj |
| 4,436,012 A | | 3/1984 | Hochanadel |
| 4,618,336 A | | 10/1986 | Isobe et al. |
| 4,702,137 A | | 10/1987 | Davidson et al. |
| 4,747,690 A | * | 5/1988 | Hayashi .................... 366/98 |
| 4,790,665 A | * | 12/1988 | Hayashi .................... 366/98 |
| 4,914,331 A | | 4/1990 | Lewis |
| 4,922,151 A | | 5/1990 | Lewis |
| 5,271,742 A | | 12/1993 | Mitcham |
| 5,306,083 A | | 4/1994 | Caldwell et al. |
| 5,348,393 A | | 9/1994 | Pappas, Jr. |
| 5,472,276 A | | 12/1995 | Ratermann et al. |
| 5,482,366 A | | 1/1996 | Konig et al. |
| 5,547,278 A | * | 8/1996 | Xie ......................... 366/203 |
| 5,653,535 A | | 8/1997 | Xie et al. |
| 5,653,654 A | | 8/1997 | Davis |
| 5,690,427 A | * | 11/1997 | Jennings ................... 366/100 |
| 5,902,202 A | | 5/1999 | Guerra |
| 5,934,802 A | | 8/1999 | Xie |
| 6,883,959 B1 | * | 4/2005 | Donthnier et al. .......... 366/203 |
| 2002/0075751 A1 | | 6/2002 | Khoub |
| 2002/0093877 A1 | | 7/2002 | Brunswick et al. |
| 2004/0120213 A1 | * | 6/2004 | Short et al. ............... 366/197 |
| 2004/0120215 A1 | * | 6/2004 | Huang et al. .............. 366/203 |
| 2004/0120216 A1 | * | 6/2004 | Donthnier et al. .......... 366/203 |
| 2004/0208082 A1 | | 10/2004 | Huang et al. |
| 2005/0002272 A1 | * | 1/2005 | Brunswick et al. ......... 366/207 |
| 2005/0122836 A1 | * | 6/2005 | Boyle et al. ............... 366/197 |
| 2005/0141340 A1 | * | 6/2005 | Donthnier et al. .......... 366/207 |

FOREIGN PATENT DOCUMENTS

| | | |
|---|---|---|
| DE | 3613231 A1 * | 10/1987 |
| DE | 4012776 C1 | 8/1991 |
| DE | 4118794 | 12/1992 |
| DE | 19754646 | 6/1999 |
| DE | 19926045 A1 | 12/2000 |
| EP | 315599 | 5/1989 |
| EP | 710442 A2 | 5/1996 |
| ES | 2037574 | 6/1993 |
| FR | 2805177 | 8/2004 |
| GB | 861915 A | 3/1961 |
| JP | 11-155730 | 6/1999 |
| JP | 2003-135950 | 5/2004 |

OTHER PUBLICATIONS

Instructions manual entitled "H600 & L800 Mixers," by Hobart Corporation (Dec. 1999).

* cited by examiner

POWER BOWL LIFT, MOTOR MOUNT AND TENSIONER FOR MIXING MACHINE

This application is a divisional of U.S. application Ser. No. 10/329,257, filed Dec. 23, 2002, now U.S. Pat. No. 6,883,959.

TECHNICAL FIELD

The present application relates generally to mixing machines utilized for mixing food products such as dough, and more particularly to a mixing machine with an independent power bowl lift and to a mixing machine motor mount and related belt tensioner.

BACKGROUND

It is known in commercial mixing machines to provide a power bowl lift system. In the past positioning of power bowl lift mechanisms has been limited by certain space constraints. Further, such systems have been mechanically linked to the drive motor used to power mixing operations, requiring the drive motor to run in order to move the bowl up and/or down.

It is also known to use belt drive systems in commercial mixing machines. However, belt tensioning is often difficult in such machines.

Accordingly, it would be advantageous to provide a mixing machine with an improved power bowl lift system and/or an improved belt tensioning arrangement.

SUMMARY

In one aspect, a mixing machine includes a head including a rotatable output member for receiving a mixer tool. A mixer body includes a bowl receiving portion below the head, the bowl receiving portion mounted for movement between a lowered position away from the head and a raised position toward the head. A drive assembly is provided for effecting rotation of the rotatable output member and includes an input shaft operatively associated with the rotatable output member, a drive motor having an output shaft and a drive linkage extending between the motor output shaft and the input shaft. The drive linkage may be one of a belt or a chain defining a loop enclosing the motor output shaft and the input shaft. A linear actuator is connected for powered movement of the bowl receiving portion back and forth between the lowered position and the raised position, and a movement axis of the linear actuator is enclosed by the loop.

In another aspect, a mixing machine includes a head including a rotatable output member for receiving a mixer tool. A mixer body includes a bowl receiving portion below the head, the bowl receiving portion mounted for movement between a lowered position away from the head and a raised position toward the head. A drive assembly is provided for effecting rotation of the rotatable output member and includes a drive motor. A linear actuator is connected for powered movement of the bowl receiving portion back and forth between the lowered position and the raised position. The linear actuator and the drive motor operate independently of each other such that the linear actuator can move the bowl receiving portion even when the drive motor is stopped.

In yet another aspect, a mixing machine includes a mixer body and a head extending outward from the mixer body and over a bowl receiving area, the head including a rotatable output member for receiving a mixer tool. A drive assembly is provided for effecting rotation of the rotatable output member and includes a drive motor with output shaft, an input shaft operatively associated with the rotatable output member, and a belt arrangement operatively connecting the motor output shaft and the input shaft. The drive motor is connected to a mount bracket and the mount bracket is pivotally connected to a fixed support to permit pivot of the mount bracket and drive motor about a pivot axis. A securing mechanism is provided for preventing pivot of the mount bracket and drive motor about the pivot axis, the securing mechanism having a released state to allow pivot of the mount bracket and drive motor. At least one vibration isolator is positioned between the drive motor and the mount bracket for reducing vibrations transmitted therebetween during motor operation.

In a further aspect, an a mixing machine having a rotatable output member for receiving a mixer tool, a drive assembly for effecting rotation of the rotatable output member and including a drive motor having an output shaft and a mount assembly, an input shaft operatively associated with the rotatable output member, and a belt operatively connecting the motor output shaft and the input shaft, a method for tensioning the belt involves the steps of pivotally connecting the mount assembly to a fixed support; providing a securing mechanism having a secured state to prevent pivoting of the mount assembly and drive motor and a released state to allow pivoting of the mount assembly and drive motor; providing a portable tensioning tool including first and second parts movable relative to each other upon rotation of one of an internally threaded portion and an externally threaded portion that engages the internally threaded portion; while the securing mechanism is in the released state: engaging the tensioning tool first part on the mount assembly for movement therewith, engaging the tensioning tool second part on a fixed support of the mixing machine, and rotating one of the internally threaded portion and the externally threaded portion in a first direction to pivot the mount assembly and drive motor from a non-tensioning position to a tensioning position; subsequent to the above engaging and rotating steps, placing the securing mechanism in the secured state; subsequent to placing the securing mechanism in the secured state, rotating the one of the internally threaded portion and the externally threaded portion in a second direction, and thereafter disengaging the tensioning tool first part from the mount assembly and disengaging the tensioning tool second part from the fixed support.

In yet another aspect, a portable tensioning tool for use in tensioning a drive belt of a mixing machine includes a rod having a protrusion extending away from an axis of the rod, the protrusion located toward a first end of the rod, the rod being threaded along a portion located toward a second end thereof. A guide extends about the rod and is movable therealong, the guide including a protrusion extending therefrom away from the axis of the rod, the guide including a stop surface at one end thereof. Spring means is positioned about the rod and located for contacting the stop surface A limiter is disposed about the rod and includes a first end and a second end, the first end configured to overlap with the spring means. The first end faces the stop surface and includes a portion for contacting the stop surface when the limiter is moved toward the stop surface and the spring means is compressed. A nut is positioned along the threaded portion of the rod and for moving the limiter toward the guide stop surface.

DETAILED DESCRIPTION

Figure 1:
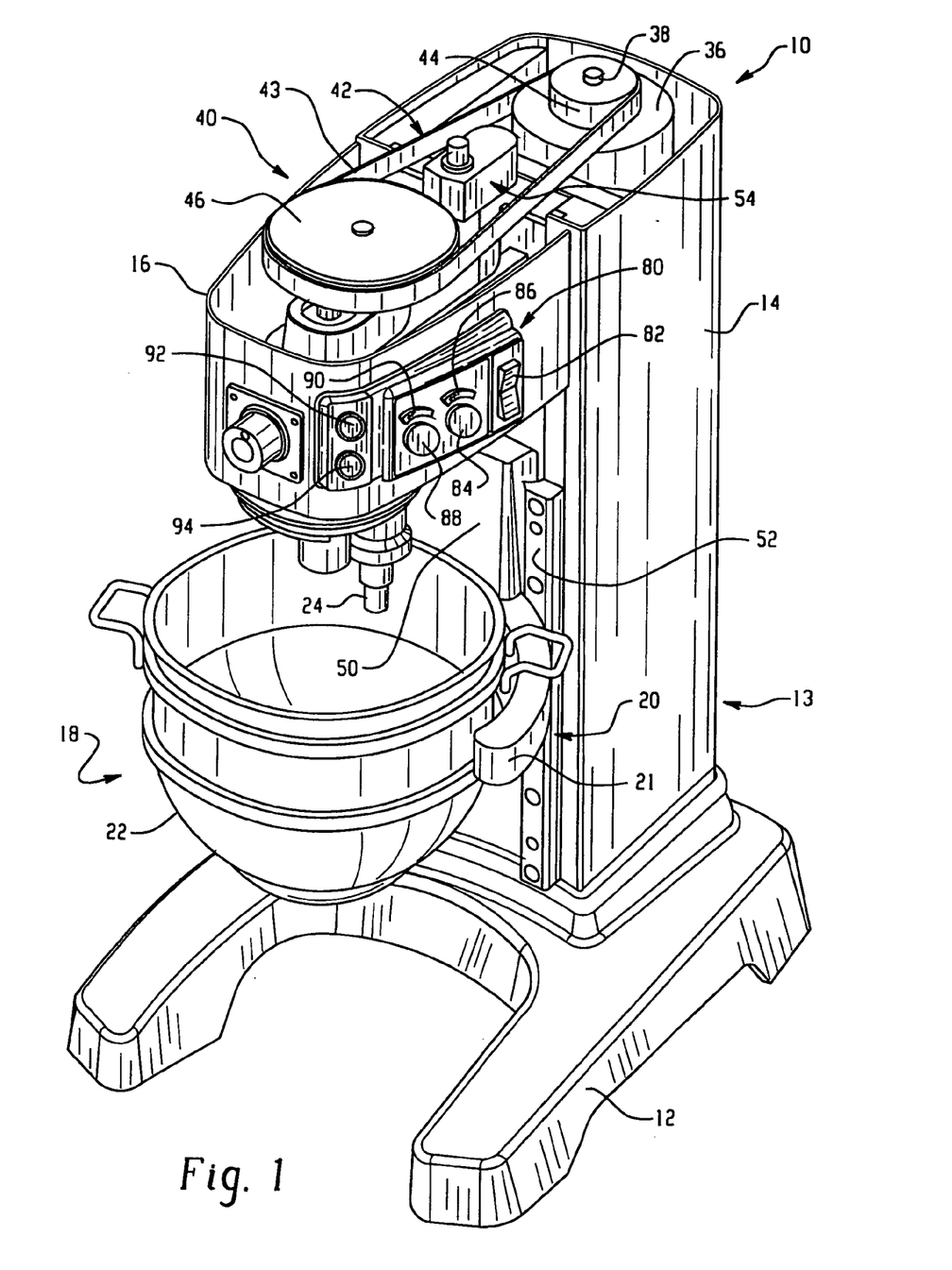
FIG. 1 is a perspective view of a mixing machine with the top cover removed.
Figure 2:
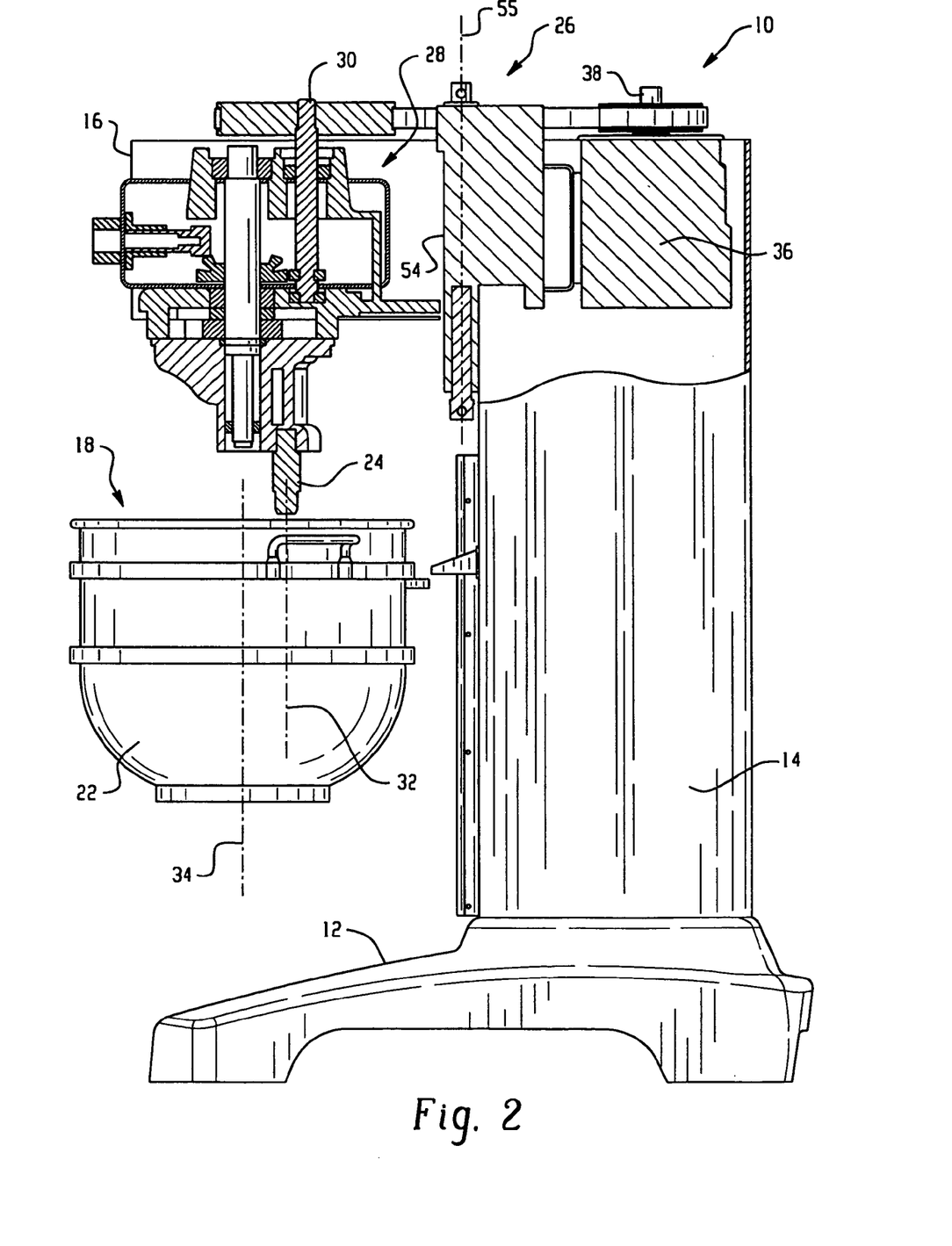
FIG. 2 is a side elevation of the mixing machine of FIG. 1 in partial cross-section.
Figure 3:
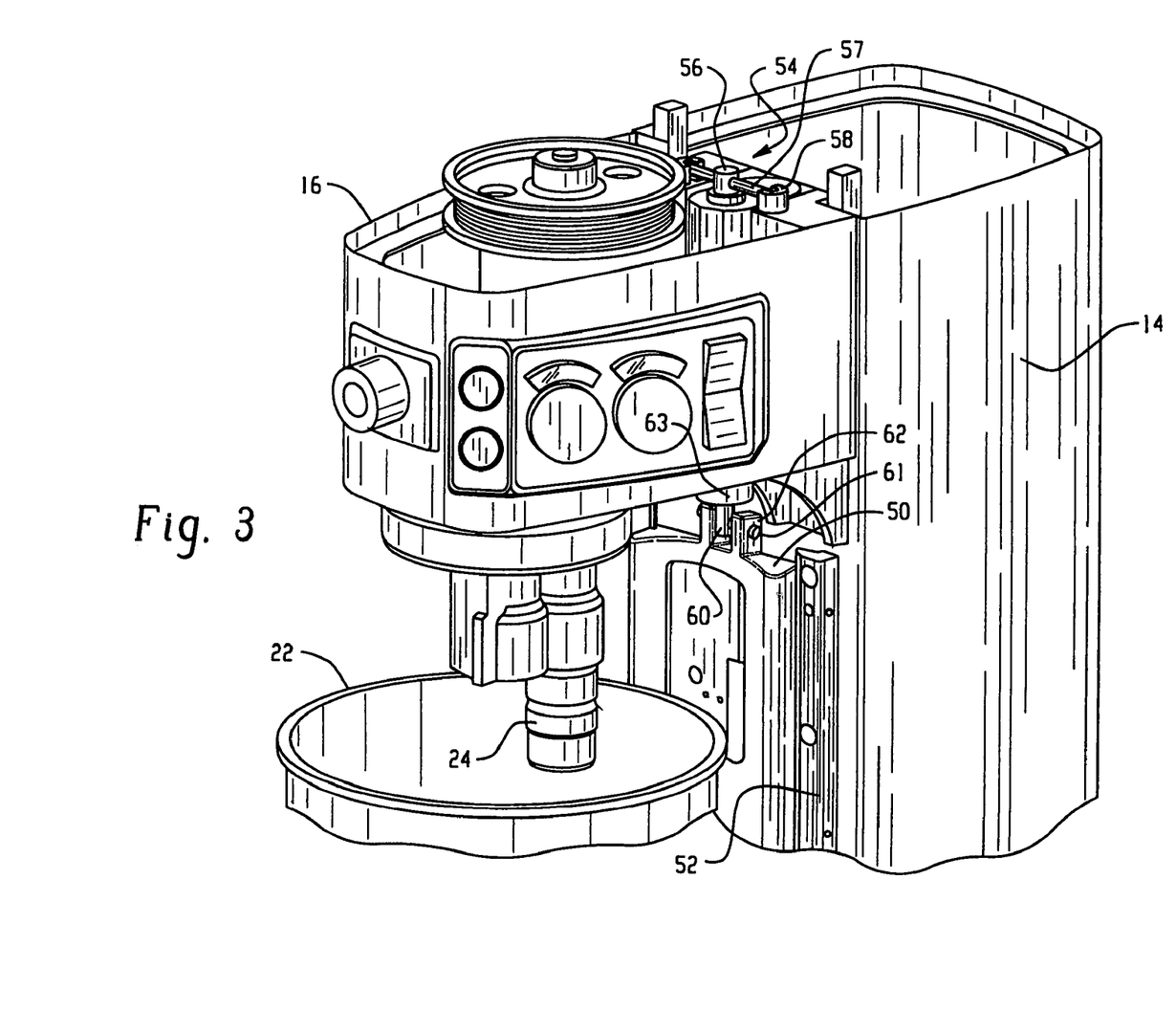
FIG. 3 is a perspective view of an upper portion of the mixing machine of FIG. 1.

Referring to FIGS. 1–3, a mixing machine 10 is shown and includes a base 12, a mixer body 13 including a column 14 extending upward from the base 10, and a head 16 extending outward from the column 14 and over a bowl receiving location 18. The bowl receiving location 18 may be defined by a bowl receiving portion 20 of the mixer body 13, where the bowl receiving portion 20 has a spaced apart curved arms 21 defining a curved shape to match the bowl 22. The head includes a downwardly extending rotatable output member 24 that can receive a mixer tool such as dough hook, whisk or other tool. The head 16 and upper portion of the column 14 typically include a detachable cover (not shown) for enclosing the components.

The mixing machine includes a drive assembly 26 for effecting rotation of the rotatable output member 24. In the illustrated machine the drive assembly is formed in part by a gear system 28 within the head 16 and having an upwardly extending input drive shaft 30. In the case of a planetary mixer, the gear system 28 may take the form of a planetary gear system, in which case the rotatable output member 24 rotates about its own axis 32, with the axis 32 orbiting around a central bowl axis 34. Also forming part of the drive assembly is a drive motor 36 that is mounted and located in line with the column 14 and includes an upwardly extending output shaft 38. A drive linkage 40 connects the motor output shaft 38 to the gear system input shaft 30 and may be formed by the illustrated belt 42 and pulleys 44 and 46. Alternative drive linkages could take the form of chain and sprocket combinations, additional gearing and/or or bar-type linkages. The illustrated drive linkage 40 is a fixed linkage, meaning that the drive ratio between the motor output shaft 38 and the gear system input shaft 30 does not change.

The bowl receiving portion 20 may be mounted for movement between a raised position toward the head 16 and a lowered position away from the head 16, the raised position being used during mixing operations and the lowered position being used for bowl installation and removal as well as for installation and removal of mixing tools on the rotatable output member 24. In this regard, the curved arms 21 of the bowl receiving portion 20 connect with a central support 50 and the support 50 rides upward and downward on a pair of spaced apart guide rails 52 on the front side of the column 14. A power lift mechanism 54, such as a linear actuator, may be provided for effecting upward and downward movement of the bowl receiving portion 20. In one embodiment, a suitable linear actuator is the Warner Electric DC24-10A5 series DC motor, 8" stroke length gear train and ACME screw actuator. A top portion 56 of the linear actuator may be secured to mounts 58 unitary with an internal casting of the head, and a lower moving arm or rod portion 60 may be connected to mounts 62 on the support 50. In both places a corresponding pin 57 or 61 extending respectively through top portion 56 and moving rod portion 60 can be used for connection to the respective mounts 58 and 62. The moving arm or rod portion 60 extends from a housing portion 63. With respect to mounts 58, the top of one or both mounts may also include an opening to receive a fastener that secures a lock plate over the slot in the mount in order to hold the pin 57 within the slot.

As shown, the belt 42 forms a continuous loop 43 that encloses both the motor output shaft 38 and the gear system input shaft 30. Further, a movement axis 55 of the linear actuator 54 extends upward through and is also enclosed by the loop. When viewed from top or bottom, the upper mounts 58 are also enclosed within the belt loop. In one embodiment, at least some part of the upper portion 56 is located at a height at or above the belt 42. The foregoing arrangement maximizes utilization of available space within the mixer head, by making use of the space enclosed by the belt loop 43.

In one embodiment a switched reluctance motor is provided as the drive motor 36. A switched reluctance motor is desirable because it can provide high torque at low operating speeds, such as those often used in mixing applications for planetary mixers. In other embodiments, an AC induction motor might be used or a DC motor might be used.

Figure 4:
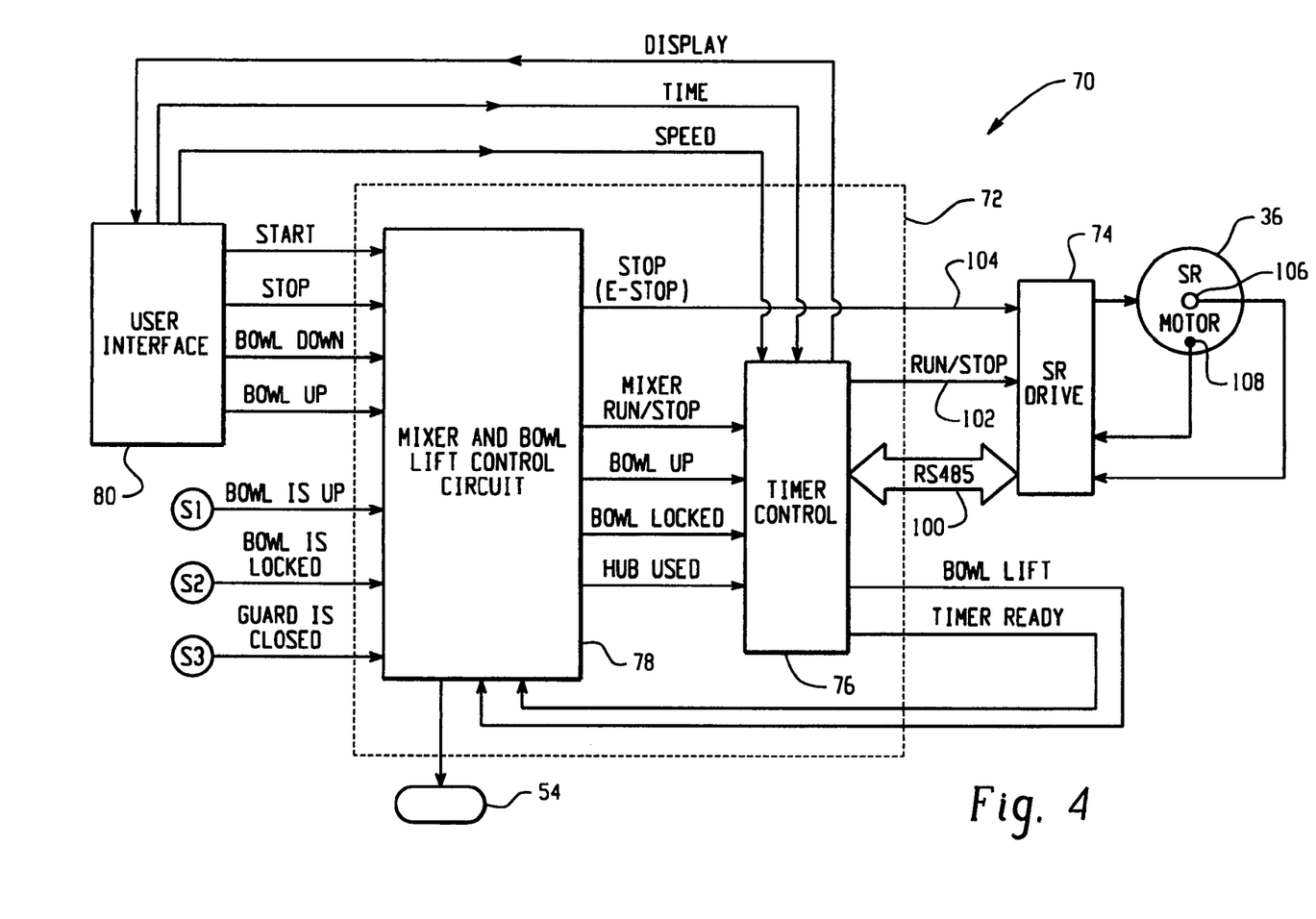
FIG. 4 is a control system schematic for the mixing machine of FIG. 1.

Referring to FIG. 4, an exemplary control arrangement for a switched reluctance motor embodiment is shown and includes a control system 70 formed by a control unit 72 and a switched reluctance ("SR") drive 74. The control unit 72 includes a processor or microcontroller based timer control unit 76 and an analog control circuit 78. A user interface 80 enables a user to input desired operations to the control unit 72, and a plurality of sensors S1, S2, and S3 are also connected with the control unit 72 and indicate the status of various parts of the mixer as will be described in more detail below. In an embodiment using an AC induction motor, a variable frequency AC drive could be used in place of the SR drive 74. In an embodiment using a DC motor a PWM type control of motor speed could be provided.

Referring again to FIG. 1, an exemplary user interface 80 is located on the head 16 and includes a plurality of input mechanisms including a bowl up/down switch 82 for activating the power bowl lift mechanism 54, a time input mechanism 84 and associated LED display 86 for inputting a desired mix time, a speed input mechanism 88 and associated LED display 90 for inputting a desired mix speed, a mix start button 92 and a mix stop button 94. Referring to FIGS. 1 and 4, the bowl up/down switch 82 may be a double-pole double-throw switch that closes a forward power path in the analog control circuit 78 when depressed in one direction (e.g. upward for BOWL UP) and closes a reverse power path in the analog control circuit 78 when depressed in the other direction (e.g. downward for BOWL DOWN), with both power paths of the analog control circuit 78 delivering power to the power lift mechanism 54 for initiating either up or down movement as may be desired. The time input mechanism 84 may be a rotating knob connected to a bi-directional rotary encoder that outputs pulses directly to the timer control 76 via the signal path labeled TIME. The timer control 76 responsively drives the LED display 86 to reflect the selected/changing mix time (e.g., in minutes and seconds). The speed input mechanism may 88 be a rotating knob connected to a six-position switch such as a Carling switch providing inputs to the timer control 76 via the signal path labeled SPEED. The timer control 76 responsively drives the LED display 90 to reflect the selected speed (e.g., Stir, 1, 2, 3, 4). Of course, in the case of each input mechanism it is contemplated that other types of devices could be used.

The mix start button 92 may be a normally-open pushbutton switch connected in the analog control circuit 78 and the mix stop button 94 may be a normally-closed pushbutton switch connected in the analog control circuit 78.

While numerous types of sensors could be used, in a simple form the sensors S1, S2, and S3 may be limit switches incorporated in the analog control circuit 78 that open or close one or more signal or power paths based upon monitored mixer parts. For example, sensor switch S1 may be located to close only when the bowl receiving portion 20 moves to its raised position (e.g. BOWL IS UP), sensor switch S2 could be located to close only when a mixer bowl is placed in an operating position relative to the bowl receiving portion 20 (e.g, BOWL IS LOCKED) and sensor switch S3 may be located to close only when a bowl guard positioned between the bowl 22 and the head 16 is in its closed position (e.g, GUARD IS CLOSED).

Referring again to FIG. 4, the control unit 72 controls operation of the SR drive 74. In particular, the timer control 76 communicates with the SR drive 74 via communications bus 100 and also outputs a RUN or STOP directive to the SR drive 74 via path 102. The SR drive 74 can also receive an emergency stop (E-STOP) directive on path 104. The SR drive 74 controls three-phase power delivery to the SR motor 36 and receives a speed indicating feedback signal from a rotary encoder 106 of the motor 36 as well as a temperature feedback signal from a temperature sensor 108. The SR drive 74 also monitors and can control the level of current delivered to the motor 36. Thus, the SR drive 74 provides closed-loop speed and acceleration control of the motor 36, and can also prevent motor overload and reduce inrush current during motor starting operations.

The control system 70 can be used to implement both count down mix operations and count up mix operations. A count down mix operation is one that occurs for a time period that is set by the operator, preferably with the time display 86 displaying a decrementing time remaining for the mix operation. A count up mix operation is one that continues until the operator causes the mix operation to stop (e.g., presses the mix stop button 94) or until some situation, other than time, causes the mix operation to stop (e.g, the bowl is moved out of its operating position or the bowl guard is opened). During the count up mix operation the time display 86 preferably displays an incrementing time of the mix operation.

As previously mentioned, the bowl up/down switch 82 may be depressed in one direction to close either a forward power path in the analog control circuit 78 (e.g. upward for BOWL UP) and in another direction to close a reverse power path in the analog control circuit 78 (e.g. downward for BOWL DOWN). In this arrangement, power delivery to the linear actuator 54 is not dependent upon the operation of the motor 36. Accordingly, the linear actuator 54 and the drive motor 36 operate independently of each other, meaning that the linear actuator 54 can move the bowl receiving portion 20 even when the drive motor 36 is stopped. In the illustrated embodiment, the timer control 76 can selectively output a signal on the BOWL LIFT line, or can otherwise affect the analog control circuit 78 (e.g., by closing a circuit path in the analog control circuit), to selectively allow forward power (bowl up direction) to be delivered to the linear actuator 54.

Figure 5:
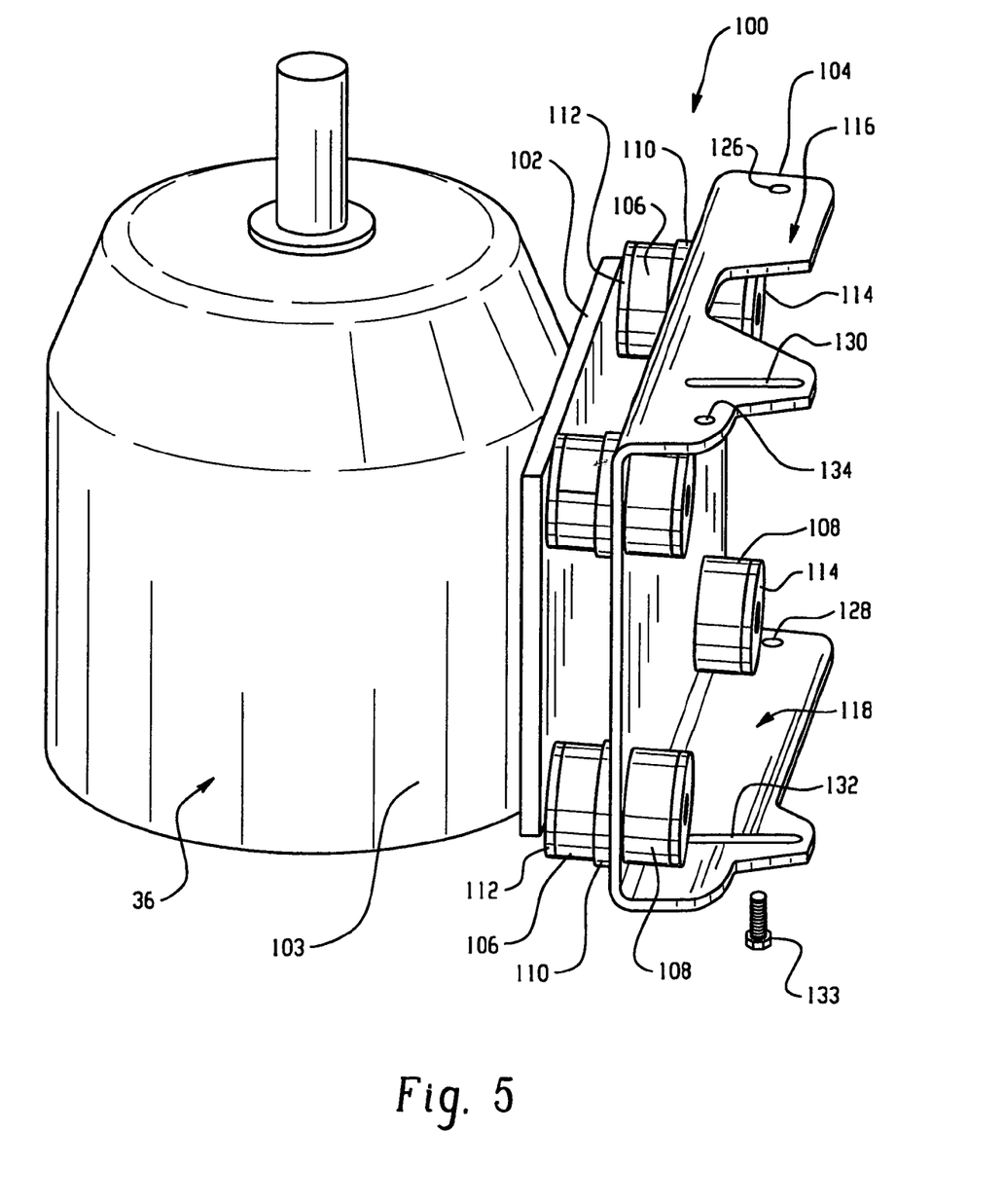
FIG. 5 illustrates one embodiment of a drive motor and motor mount assembly.
Figure 6:
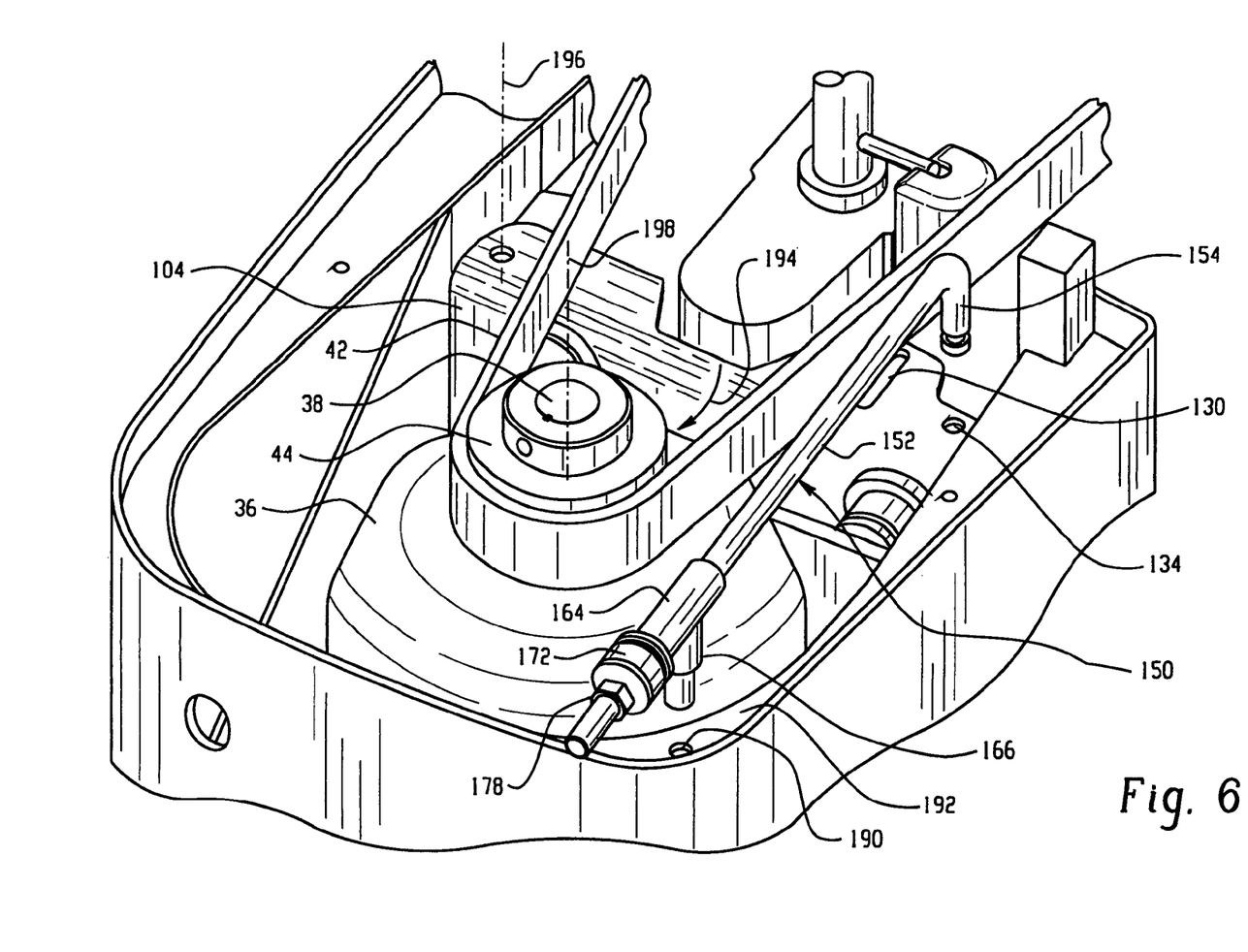
FIG. 6 shows the motor and motor mount assembly within the mixer.
Figure 7:
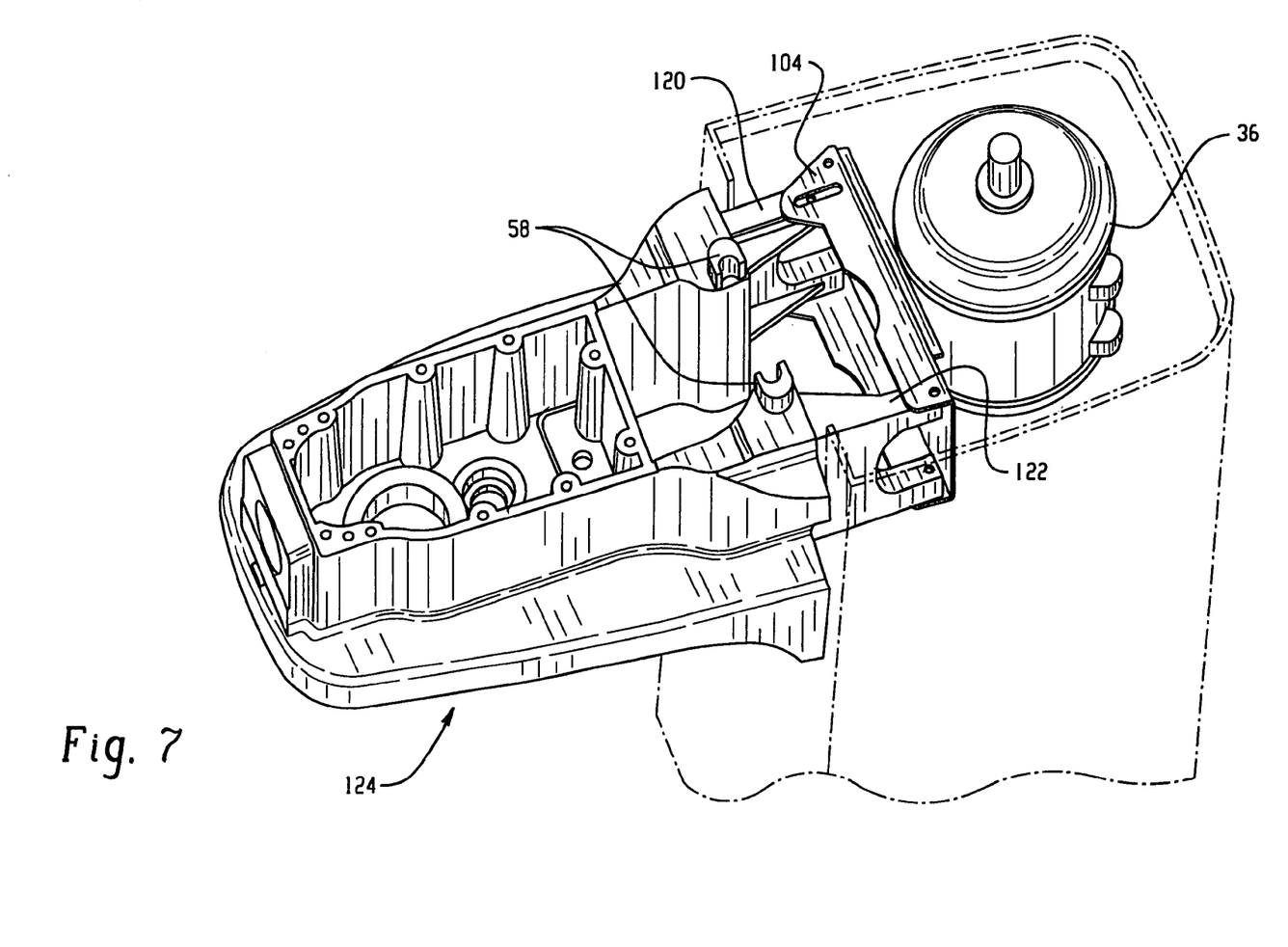
FIG. 7 shows the motor mount assembly as associated with a metal casting.

Referring now to FIGS. 5–7, a mount arrangement for the motor 36 is described. In particular, the motor 36 includes a mount assembly 100 for mounting the motor within the mixer. The illustrated motor mount assembly 100 includes a plurality of mount feet 102 formed unitary with and extending from the motor housing 103. In the alternative, the mount feet could be attached to the motor housing by, for example, a welding process. The mount feet 102 are connected to a mount bracket 104. In order to reduce vibrations transmitted from the motor 36 to the fixed support to which the motor mount assembly is connected, a plurality of vibration isolators 106 are provided. Vibration isolators 108 are also provided. Isolating such vibrations helps reduce the noise level generated during motor operation by isolating the motor. In the illustrated embodiment, the mount bracket 104 and mount feet 102 are connected together by four nut and bolt combinations (not shown). The bolts pass through openings in the feet and bracket, and also pass through sleeve openings in the vibration isolators 106 and 108. One vibration isolator 106 is disposed about each bolt in the region between the mount bracket 104 and mount feet 102, and another vibration isolator 108 is disposed about a portion of each bolt positioned on the opposite side of the mount bracket 104. Washers 110 and 112 may be provided to each side of the four vibration isolators 106 positioned between the mount bracket 104 and mount feet 102, and washers 114 may be provided as shown adjacent the four vibration isolators 108. The vibration isolators 106 and 108 may be formed of any suitable material depending upon the vibration characteristics experienced by a given mixing machine configuration. In one example, an armor plated rubber materials might be used for the vibration isolators.

The mount bracket 104 includes an upper flange portion 116 and a lower flange portion 118 that fit respectively over and under side mount portions 120 and 122 of metal casting 124 (shown in FIG. 7 without linear actuator mounts 58), which acts as a fixed support. The metal casting 124 may be bolted to internal, vertical support rods of the mixer body. Each mount portion 120 and 122 is formed respectively by a pair of vertically spaced arms, with the arms having aligned holes (not shown) therethrough. The mount bracket flanges 116 and 118 include respective holes 126 and 128 toward one side, the holes 126 and 128 also vertically aligned. The holes 126 and 128 are positioned into alignment with the aligned holes of mount portion 122 and a rod or pin (not shown) is passed through all of the aligned holes to form a hinge about which the mount bracket 104 and drive motor 36 can pivot. A retaining ring or clip (not shown) is provided for the hinge rod to secure it in place. The opposite side of each of the mount bracket flanges 116 and 118 is provided with a respective slot 130 and 132 formed therein, the two slots 130 and 132 being vertically aligned. The slots 130 and 132 are aligned with the threaded openings of the metal casting mount portion 120 and bolts 133 (FIG. 5) are threaded into the casting, one from the top the other from the bottom. The bolts 133 may included serrated heads. The bolts 133 passing through the slot 130 and threaded into the casting act as securing mechanisms to selectively permit or prevent pivot of the mount bracket 104 and drive motor 136. In particular, the bolts can be tightened to prevent pivot, and the bolts can be loosened to a released state that will permit pivoting. The upper flange portion 116 may also include an additional opening 134 therethrough. As will be described in more detail below, the aforementioned pivoting mount arrangement is used to tension the belt 42.

Figure 8:
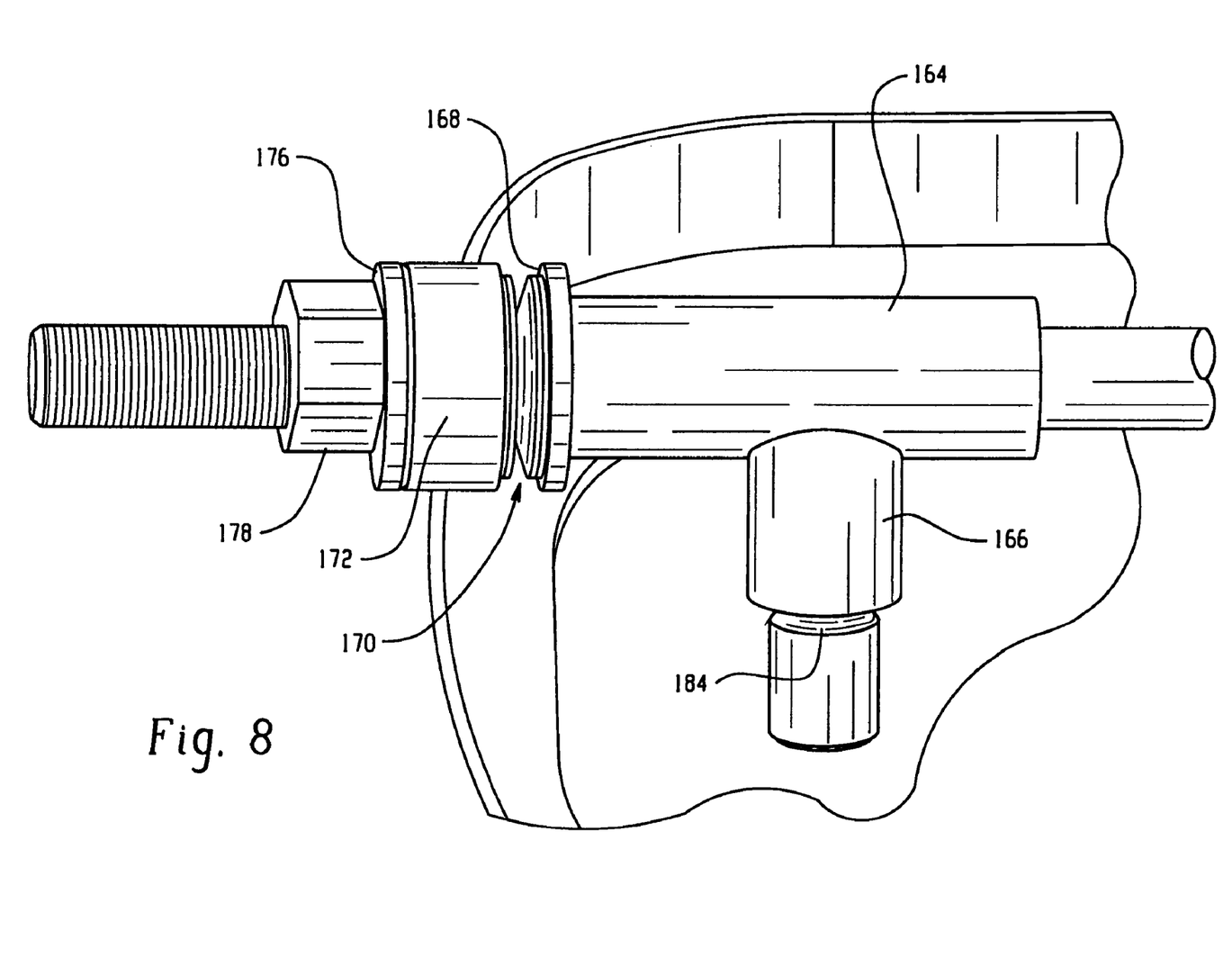
FIG. 8 shows a rear portion of a belt tensioning tool.
Figure 9:
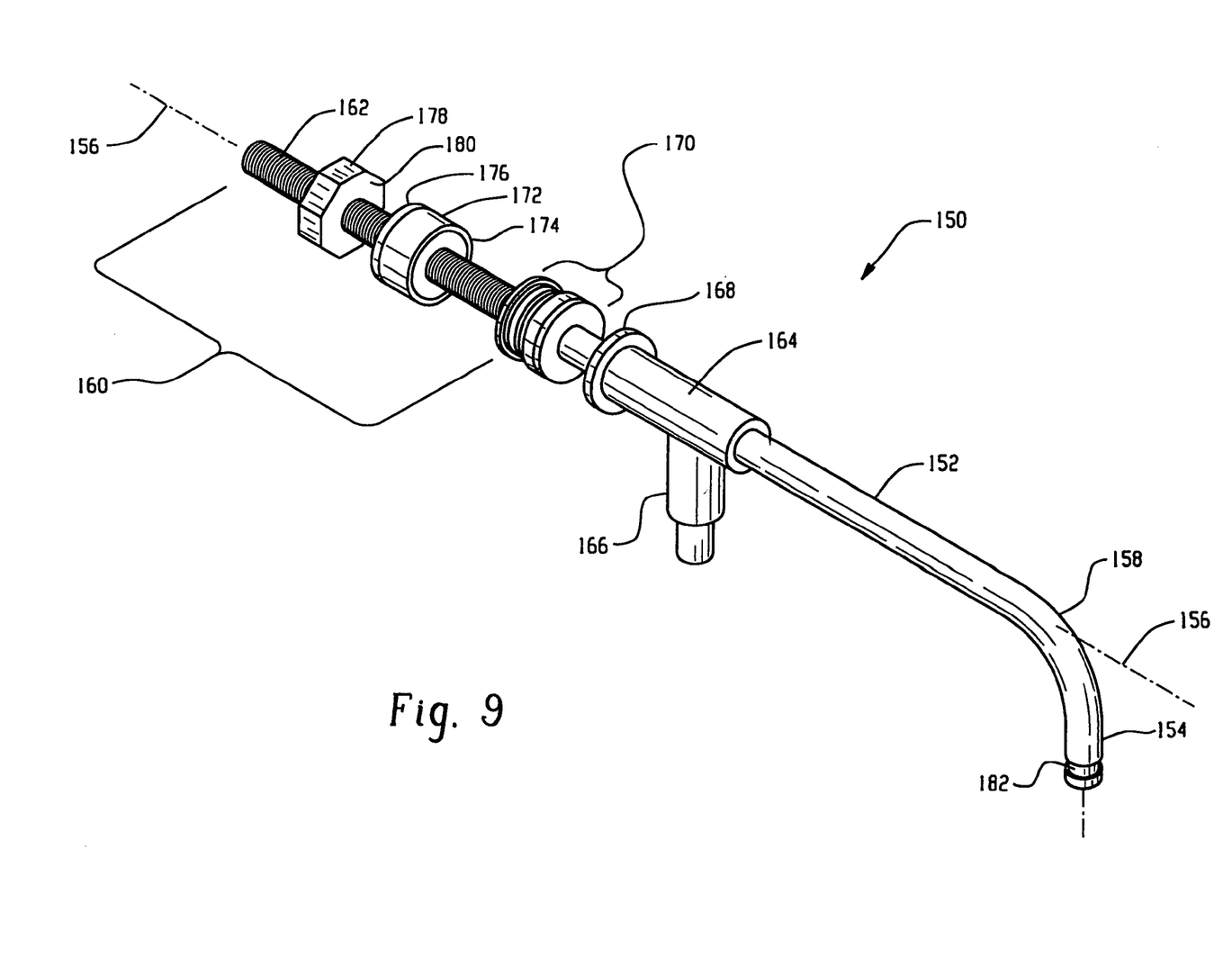
FIG. 9 shows a full view of the belt tensioning tool.

Referring now to FIGS. 6, 8 and 9, a portable belt tensioning tool 150 and tensioning method are described. The belt tensioning tool 150 includes a rod 152 having a protrusion 154 extending away from an axis 156 of the rod 152. The protrusion 154 is located toward one end 158 of the rod 152, and in the illustrated embodiment is formed by acute bending the end portion of the rod as shown. The rod 152 is externally threaded along at least a portion 160 located toward end 162. A guide 164 extends about the rod 152 and is movable therealong. In the illustrated embodiment the guide includes a through opening and is slidably received on the rod 152. The guide includes a protrusion 166 extending therefrom away from the axis 156 of the rod 152. The guide also includes a stop surface 168 at one end thereof.

Spring means 170 is positioned about the rod 152 and located for contacting the stop surface 168. In the illustrated embodiment the spring means is formed by a Bellville spring washer set, but it is recognized that other suitable spring means could be used such as one or more coil springs or spacer and wave springs. A limiter 172 is disposed about the rod 152 and includes end 174 and end 176, with end 174 configured to overlap with the spring means 170. The limiter 172 preferably slides along the rod 152. In the illustrated embodiment end 174 is tubular in nature to received the spring means 170 therein, but it is recognized that other variations are possible, including where the end 174 is adapted to lie closely adjacent the rod 152 and the spring means is sized to fit around the outside of end 174. The end 174 faces the stop surface 168 and includes a portion for contacting the stop surface 168 if the limiter 172 is moved toward the stop surface 168 and the spring means 170 is sufficiently compressed between the limiter 170 and stop surface 168. An internally threaded nut 178 is positioned along the threaded portion 160 of the rod 152 and has one end 180 facing the end 176 of the limiter 172 for engagement therewith. Alternatively, the nut and limiter could be unitary with each other.

Both the protrusion 154 and the protrusion 166 may include a respective annular slot 182 and 184 formed therein to facilitate belt tensioning in the manner hereafter described.

In the mixing machine 10, the belt 42 can be tensioned using the portable tensioning tool 150 as follows. The rod protrusion 154 is engaged in the opening 134 in the mount bracket 104, preferably with annular slot 182 contacting an edge of the opening 134. The opening 134 could also be formed on part of the motor housing 103. The guide protrusion 166 is engaged in an opening 190 of an interior fixed plate portion 192 of the mixing machine frame, with the nut 178 being rotated counterclockwise (when viewed from end 162 to end 158) to move toward rod end 162 if needed to allow the guide 164 to be moved to a position to allow the protrusion 166 to align with the opening 190. Preferably, the annular slot 184 is aligned for contacting the edge of the opening 190. While the bolts or other securing mechanisms through slots 130 and 132 are in the released state, the nut 178 is rotated clockwise to move the nut 178 toward end 158 of the rod. When the nut engages the limiter 172 and the spring means 170 begins to compress between the limiter 172 and the stop surface 168 of the guide 164, the compression of spring means 170 causes a force to be exerted on the rod 152 that tends to pull the rod 152 so that rod end 158 moves in a direction toward the guide 164. When this occurs, the mount bracket 104 and drive motor 36 are pivoted clockwise (when viewed from the top) as indicated by arrow 194 about hinge axis 196, moving the motor output shaft 38 and pulley 44 further away from the gear system input shaft 30 and pulley 46, thereby increasing the tension in belt 42. The nut 178 is rotated sufficiently to move the mount bracket 104 and drive motor 36 from a non-tensioning position to a final tensioning position. In one embodiment, for new belt installation the outside edge or end 174 of the limiter 172 contacts the stop surface 168 of guide 164 and for used belt retensioning the end 174 of the limiter 172 is spaced from the stop surface 168 of guide 164 by some amount. The bolts through slots 130 and 132, or other securing mechanism(s), are then placed in the secured state to prevent the mount bracket 104 and drive motor 36 from further pivoting. The tensioning tool nut 178 is then rotated counterclockwise again to move toward rod end 162, releasing the compression of spring means 170. When the nut 178 has been rotated sufficiently the annular slot 184 of guide protrusion 166 is no longer urged into contact with the edge of opening 190 and the annular slot 182 of rod protrusion 154 is no longer urged into contact with the edge of opening 134, allowing both protrusions to be disengaged from their respective openings 190 and 134 to permit removal of the tensioning tool 150.

With respect to determining the final tensioning position of the motor 36 and mount bracket 104, the metal casting 124 can be formed with a tension indicator on a top portion thereof, the indicator aligning with an edge portion of the upper flange 116 of the mount bracket 104 to give an operator a visual means to determine when the mount bracket 104 has been pivoted far enough to provide desired tension on the belt 42. The tension indicator could be as simple as a single mark to which the edge portion of the upper flange 116 is aligned. More developed tension indicators could be formed as scales with a plurality of marks, such as one for new belts and one or more for used belts. Another technique to achieve desired belt tensioning would be to use a torque wrench for rotating nut 178.

During the above-described tensioning process the tension force built up in the belt 42 produces a torque tending to cause the upper part of the drive motor 36 to be rotated relative to the lower part of the drive motor 36. Accordingly, when the motor 36 is in the non-tensioning position its output axis 198 has an orientation that is non-parallel to its orientation when the motor 36 is in the tensioning position. In order to allow for this change in orientation of the motor axis 198 during tensioning, the spacing between the mount bracket 110 and the mount feet 102 can initially be made greater at the upper side than at the lower side. For example, the upper washers 112 can be made slightly thicker than the lower washers as shown in FIG. 5. The lower bolt through slot 132 in bracket 104 is threaded clockwise into the metal casting 120 until the head of the bolt contacts the surface of the bracket, then the bolt is turned back counterclockwise ¼ turn to prevent binding of bracket 104 while maintaining the surface of the mount bracket parallel to the surface of the metal casting during the tensioning process. During tensioning, the upper vibration isolators 106 will compress slightly due to the aforementioned torque, bringing the motor output axis 198 into a substantially vertical orientation. As an alternative to using washers of different thickness, the upper mount feet 102 could be formed so as to be spaced slightly further away from the motor output axis 198 as compared to the lower mount feet.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A mixing machine, comprising:
   a head including a rotatable output member for receiving a mixer tool;
   a mixer body including a bowl receiving portion below the head, the bowl receiving portion mounted for movement between a lowered position away from the head and a raised position toward the head,
   a drive assembly for effecting rotation of the rotatable output member and including an input shaft operatively associated with the rotatable output member, a drive motor having an output shaft, a drive linkage extending between the motor output shaft and the input shaft, the drive linkage including one of a belt or a chain defining a loop enclosing the motor output shaft and the input shaft; and
   a linear actuator connected for powered movement of the bowl receiving portion back and forth between the lowered position and the raised position, a movement axis of the linear actuator enclosed by the loop.

2. The mixing machine of claim 1 wherein the mixer body includes a column and the drive motor is located in-line with the column and the output shaft extends upward.

3. The mixing machine of claim 2 wherein the input shaft connects to the rotatable output member through a gear system within the head.

4. The mixing machine of claim 3 wherein at least a portion of the linear actuator extends above a height of the belt or chain.

5. The mixing machine of claim 1 wherein an upper portion of the linear actuator is located at a height that is the same as a height of at least part of the belt or chain.

6. The mixing machine of claim 1 wherein the head includes a pair of mounts therein, an upper shaft portion of the linear actuator operatively connected to the mounts.

7. The mixing machine of claim 6 wherein the mounts are enclosed by the loop.

8. The mixing machine of claim 6 wherein the mounts are unitary with a metal casting of the head.

9. The mixing machine of claim 8 wherein the drive linkage comprises a bolt drive linkage and the loop is defined by a belt, the metal casting further includes first and second spaced apart mount portions unitary therewith, the drive motor includes a mount bracket having a first side connected to the first mount portion to form a hinge axis about which the mount bracket rotates, the mount bracket having a second side connected to the second mount portion by a securing mechanism for preventing rotation of the mount bracket about the hinge, the securing mechanism having a released state to allow rotation of the mount bracket about the hinge.

10. The mixing machine of claim 1 wherein the movement axis is defined by a moving arm that extends partially internal to a housing, and the linear actuator includes a drive motor aligned alongside the movement axis.

11. The mixing machine of claim 1 wherein the linear actuator comprises a screw type actuator.

12. The mixing machine of claim 1 wherein the linear actuator and the drive motor operate independently of each other such that the linear actuator can move the bowl receiving portion even when the drive motor is stopped.

13. A mixing machine, comprising:
    a head including a rotatable output member for receiving a mixer tool;
    a mixer body including a bowl receiving portion below the head, the bowl receiving portion mounted for movement between a lowered position away from the head and a raised position toward the head;
    a drive assembly for effecting rotation of the rotatable output member and including a drive motor; and
    a linear actuator connected for powered movement of the bowl receiving portion back and forth between the lowered position and the raised position, wherein the linear actuator and the drive motor operate independently of each other such that the linear actuator can move the bowl receiving portion even when the drive motor is stopped; and a metal casting within the head wherein an upper portion of the linear actuator is connected with the metal casting and wherein the drive motor is pivotally mounted to the metal casting.

14. The mixing machine of claim 13 wherein the linear actuator comprises a screw type actuator.

15. A mixing machine, comprising:
    a head including a rotatable output member for receiving a mixer tool;
    a mixer body including a bowl receiving portion below the head, the bowl receiving portion mounted for movement between a lowered position away from the head and a raised position toward the head;
    a drive assembly for effecting rotation of the rotatable output member and including a drive motor;
    a linear actuator connected for powered movement of the bowl receiving portion back and forth between the lowered position and the raised position, wherein the linear actuator and the drive motor operate independently of each other such that the linear actuator can move the bowl receiving portion even when the drive motor is stopped;
    wherein the linear actuator includes an upper end that is connected to a metal casting within the head;
    wherein the metal casting includes a pair of spaced apart mounts unitary therewith, the upper end of the linear actuator is connected to each of the mounts.

* * * * *

UNITED STATES PATENT AND TRADEMARK OFFICE
CERTIFICATE OF CORRECTION

PATENT NO. : 7,014,354 B2  
DATED : March 21, 2006  
INVENTOR(S) : Thomas S. Donthnier et al.

It is certified that error appears in the above-identified patent and that said Letters Patent is hereby corrected as shown below:

<u>Column 9,</u>  
Line 44, change "bolt" to -- belt --.

Signed and Sealed this

Thirteenth Day of June, 2006

JON W. DUDAS  
*Director of the United States Patent and Trademark Office*